No. 755,270. PATENTED MAR. 22, 1904.
C. D. BRENT.
FASTENER FOR SHOES.
APPLICATION FILED OCT. 9, 1903.
NO MODEL.
Fig. 1.
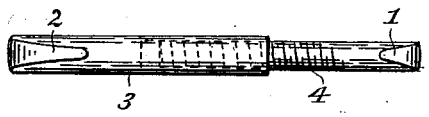
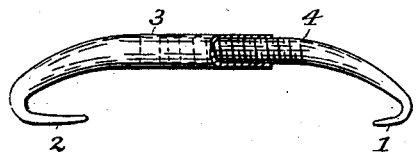
Fig. 2.
Witnesses
E. B. Bolton
H. M. Kuehne
Inventor:
Charles Daniel Brent
By Richard
his Attorneys.

No. 755,270. Patented March 22, 1904.

UNITED STATES PATENT OFFICE.

CHARLES DANIEL BRENT, OF CROMWELL, OTAGO, NEW ZEALAND.

FASTENER FOR SHOES.

SPECIFICATION forming part of Letters Patent No. 755,270, dated March 22, 1904.

Application filed October 9, 1903. Serial No. 176,404. (No model.)

*To all whom it may concern:*

Be it known that I, CHARLES DANIEL BRENT, dredgeman, of Cromwell, Otago, New Zealand, have invented a certain new and useful Fastener for Shoes and the Like, of which the following is a specification.

This invention relates mainly to fasteners for shoes and other articles of wearing-apparel, such as shown in an application for Letters Patent filed by me on May 7, 1903, Serial No. 156,105. Its object is to provide a simple and inexpensive and durable adjustable fastener which will do away with laces and the like and which will fasten the sides of shoes and the like such as are made at present with holes on each side of the edge of the parts to be fastened together and which may also be easily operated both in fastening and unfastening.

It consists of the features, combination, and arrangement of parts hereinafter described, and more particulary pointed out in the claim.

In the accompanying drawings, Figure 1 is a side view of the fastener. Fig. 2 is a plan view of same.

In the drawings the same numbers refer to the same or similar parts.

The adjustable fastener is made in two portions, the shanks of said portions being curved or bent to fit the instep comfortably, and the fastener is provided at one end with a small hooked portion 1 and at the other end with a longer hooked portion 2. The end 3 of the portion with the longer hook is hollowed and internally threaded, so as to receive the externally-threaded part 4 of the portion having the smaller hook 1. The end of the hook 2 is narrow, and it will be seen that after it is placed in the eye the device may be lengthened or shortened by unscrewing or screwing in, respectively, the threaded portion 4 to suit, as desired, any distance between two opposite eyes. The hook 2 may be squeezed after insertion in the eye of a shoe, so as to grip a side of the shoe tightly.

The fastener is adjusted by the screw-threads to suit the widths between the eyes in the sides of the shoe.

Having now described my invention, what I claim as new, and desire to secure by Letters Patent, is—

A fastener consisting of two hooked portions having their shanks curved, one of said shanks being internally threaded and the other externally threaded and connected together substantially as described.

In witness whereof I have hereunto set my hand in presence of two witnesses.

CHARLES DANIEL BRENT.

Witnesses:
  A. V. PARK,
  J. R. PARK.